US008780948B2

(12) United States Patent
Wilkinson et al.

(10) Patent No.: US 8,780,948 B2
(45) Date of Patent: Jul. 15, 2014

(54) PRECISION PHOTONIC OSCILLATOR AND METHOD FOR GENERATING AN ULTRA-STABLE FREQUENCY REFERENCE USING A TWO-PHOTON RUBIDIUM TRANSITION

(75) Inventors: Steven R. Wilkinson, Stevenson Ranch, CA (US); Todd O. Clatterbuck, Los Angeles, CA (US); Matthew T. Cashen, Beverly Hills, CA (US); Gabriel N. Price, Redondo Beach, CA (US); Jeffrey L. Sabala, Northridge, CA (US)

(73) Assignee: Raytheon Company, Waltham, MA (US)

( * ) Notice: Subject to any disclaimer, the term of this patent is extended or adjusted under 35 U.S.C. 154(b) by 110 days.

(21) Appl. No.: 13/400,348

(22) Filed: Feb. 20, 2012

(65) Prior Publication Data

US 2013/0215918 A1    Aug. 22, 2013

(51) Int. Cl.
*H01S 3/13* (2006.01)

(52) U.S. Cl.
USPC ............................ 372/32; 372/29.02; 372/18

(58) Field of Classification Search
CPC ..... H01S 3/1303; H01S 3/1392; H01S 3/139; H01S 3/13
USPC .......................................... 372/32, 29.02, 18
See application file for complete search history.

(56) References Cited

U.S. PATENT DOCUMENTS

| | | |
|---|---|---|
| 5,866,896 A | 2/1999 | Georgiades et al. |
| 6,724,788 B1 * | 4/2004 | Holzwarth et al. ............. 372/32 |
| 6,785,303 B1 | 8/2004 | Holzwarth et al. |
| 6,850,543 B2 * | 2/2005 | Cundiff et al. .................. 372/18 |
| 7,026,594 B2 | 4/2006 | Holzwarth et al. |
| 7,035,297 B1 * | 4/2006 | Denman et al. ................ 372/21 |
| 7,376,354 B2 | 5/2008 | White |
| 7,391,367 B2 | 6/2008 | Newberg et al. |
| 7,508,851 B2 | 3/2009 | Yoshitomi et al. |
| 7,593,643 B2 | 9/2009 | Diels |
| 7,593,644 B2 | 9/2009 | Kaertner et al. |

(Continued)

FOREIGN PATENT DOCUMENTS

| | | |
|---|---|---|
| JP | 2013171285 A | 9/2013 |
| NO | WO-2012/082507 A1 | 6/2012 |

OTHER PUBLICATIONS

"European Application Serial No. 12162599.0, European Search Report mailed May 13, 2013", 14 pgs.

(Continued)

*Primary Examiner* — Kinam Park
(74) *Attorney, Agent, or Firm* — Schwegman, Lundberg & Woessner, P.A.

(57) ABSTRACT

Embodiments of an ultra-stable frequency reference generating system and methods for generating an ultra-stable frequency reference using a two-photon Rubidium transition are generally described herein. In some embodiments, a cavity-stabilized reference laser comprising a laser source is locked to a stabilized cavity. A Rubidium cell is interrogated by a stabilized laser output to cause at least a two-photon Rubidium transition and a detector may detect fluorescence resulting from spontaneous decay of the upper state Rubidium transition. The output of the detector is provided at a wavelength of the fluorescence to lock the cavity-stabilized reference laser to generate a stabilized laser output. A frequency comb stabilizer may be locked to the stabilized laser output to generate a super-continuum of optical wavelengths for use in generating an ultra-stable frequency reference.

25 Claims, 4 Drawing Sheets

(56) References Cited

U.S. PATENT DOCUMENTS

| | | | |
|---|---|---|---|
| 7,809,222 | B2 | 10/2010 | Hartl et al. |
| 7,940,390 | B2 | 5/2011 | Kaertner et al. |
| 7,982,944 | B2 | 7/2011 | Kippenberg et al. |
| 2004/0017833 | A1* | 1/2004 | Cundiff et al. .................. 372/18 |
| 2004/0021056 | A1* | 2/2004 | Holzwarth et al. ........... 250/206 |
| 2004/0165639 | A1* | 8/2004 | Lang et al. ....................... 372/92 |
| 2007/0086713 | A1* | 4/2007 | Ingmar et al. ................. 385/122 |
| 2011/0134943 | A1 | 6/2011 | Hartl et al. |
| 2012/0154062 | A1* | 6/2012 | Wilkinson et al. ........... 331/94.1 |

OTHER PUBLICATIONS

Diddams, S. A., "Low-Noise Microwave and Optical Waveform Synthesis with Femtosecond Laser Frequency Combs", *The 20th Annual Meeting of the IEEE Lasers and Electro-Optics Society*, (LEOS 2007), (2007), 31-732.

Kim, Y., et al., "Fiber-based frequency comb with mHz relative linewidth carrier-envelope-offset frequency", *2010 Conference on Lasers and Electro-Optics (CLEO) and Quantum Electronics and Laser Science Conference (QELS)*, (2010), 1-2.

Ma, L.-S., "Optical Atomic Clocks—From Dream to Reality", *Optics and Photonics News*, 18(9), (2007), 42-47.

Millerioux, Y., et al., "Towards an accurate frequency standard at $\lambda=778$ nm using a laser diode stabilized on a hyperfine component of the Doppler-free two-photon transitions in rubidium.", *Optics Communication*, 108(1-3), (1994), 91-96.

Yoon, T. H., et al., "Phase-coherent multilevel two-photon transitions in cold Rb atoms: Ultrahigh-resolution spectroscopy via frequency-stabilized femtosecond laser", *Physical Review*, 63(1), (Dec. 2000), 011402-1-011402-4.

Bartels, A., et al., "Mode-locked laser pulse trains with subfemtosecond timing jitter synchronized to an optical reference oscillator", Optics Letters, 28(8), (2003), 663-665.

Bernard, J. E., et al., "Absolute frequency measurement of a laser at 1556 nm locked to the 5S 1/2-5D 5/2 two-photon transition in 87 Rb", Optics Communications, 173, (2000), 357-364.

Danielli, A., et al., "Frequency stabilization of a frequency-doubled 1556-nm source to the 5S 1/2 5D 5/2 two-photon transitions of rubidium", Optics Letters, 25(12), (2000), 905-907.

Edwards, C. S, et al., "Development and absolute frequency measurement of a pair of 778 nm two-photon rubidium standards", Metrologia, 42(5), (2005), 464-467.

Hilico, L., et al., "Metrological features of the rubidium two-photon standards of the BNM-LPTF and Kastler Brossel Laboratories", The European Physical Journal—Applied Physics, 4(2), (Nov. 1998), 219-225.

Ludlow, A. D, et al., "Compact, thermal-noise-limited optical cavity for diode laser stabilization at $1\times10-15$", ?Optics Letters, 32(6), (2007), 641-643.

Ramond, T. M, et al., "Phase-coherent link from optical to microwave frequencies by means of the broadband continuum from a 1-GHz Ti:sapphire femtosecondoscillator", Optics Letters, 27(20), (2002), 1842-1844.

Stoehr, H., et al., "Diode laser with 1 Hz linewidth", Optics Letters, 31(6), (2006), 736-738.

* cited by examiner

PRECISION PHOTONIC OSCILLATOR AND METHOD FOR GENERATING AN ULTRA-STABLE FREQUENCY REFERENCE USING A TWO-PHOTON RUBIDIUM TRANSITION

GOVERNMENT RIGHTS

This invention was not made with United States Government support. The United States Government does not have certain rights in this invention.

TECHNICAL FIELD

Embodiments pertain to precisions oscillators and the generation of ultra-stable frequency references. Some embodiments relate to photonic oscillators. Some embodiments relate to frequency reference generation and communication systems. Some embodiments relate to low-phase noise ultra-stable oscillators for radar systems and airborne systems.

BACKGROUND

One issue with many conventional frequency references is stability. Conventional techniques for reaching frequency stabilities (i.e., $\Delta f/f$) in the range of $10^{-14}$ or better use cryogenically cooled crystal oscillators, cesium fountain clocks, and/or highly stabilized optical clocks. Many of these conventional frequency references are not attractive due to their large size, weight, complexity and/or power consumption.

Thus, there are general needs for improved precision oscillators and methods for generating ultra-stable frequency references. There are also general needs for precision oscillators and methods for generating ultra-stable frequency references that are less complex than many conventional systems. There are also needs for low-phase noise and ultra-stable oscillators that are suitable for use in radar systems, communication systems and signal-collection systems. There are also needs for ultra-stable oscillators for use in systems that require synchronization. There are also needs for ultra-stable oscillators suitable for use in difficult EMI environments. There are also needs for an ultra-stable frequency reference that can provide a frequency stability that exceeds $10^{-14}$.

SUMMARY

In some embodiments, an ultra-stable frequency reference generating system include a cavity-stabilized reference laser comprising a laser source locked to a stabilized cavity to generate a stabilized laser output, a Rubidium cell configured to be interrogated by the stabilized laser output to cause at least a two-photon Rubidium transition, and a detector to detect fluorescence resulting from the spontaneous decay of this upper state Rubidium transition. The detector may provide an output at the wavelength of the fluorescence to lock the cavity-stabilized reference laser to generate a stabilized laser output. A frequency comb stabilizer may be included to lock to the stabilized laser output to generate a super-continuum of optical wavelengths for use in generating an ultra-stable frequency reference covering a broad spectral range.

In some embodiments, an ultra-stable frequency reference generating system is provided that includes a cavity lock loop to lock a laser source to a stabilized cavity and generate a pre-stabilized laser output and a frequency control loop to further lock the laser source to a decay of an upper state Rubidium transition using two photon excitation to generate a stabilized laser output. The system may also include a frequency comb stabilizer having a first frequency comb stabilizer control loop to stabilize a frequency comb relative to zero frequency and a second frequency comb stabilizer control loop to stabilize the frequency comb spacing. The frequency comb may be a femtosecond frequency comb.

In some embodiments, a method to generate an ultra-stable frequency reference is provided. In these embodiments, a laser source is locked to a stabilized cavity to generate a pre-stabilized laser output. The laser source is further locked to the decay of a two-photon Rubidium transition to generate a stabilized laser output. A frequency comb stabilizer is locked to the stabilized laser output to generate an optical output for use in generating an ultra-stable frequency reference.

BRIEF DESCRIPTION OF THE DRAWINGS

The claims are directed to some of the various embodiments disclosed herein. However, the detailed description presents a more complete understanding of the various embodiments when considered in connection with the figures, wherein like reference numbers refer to similar items throughout the figures.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
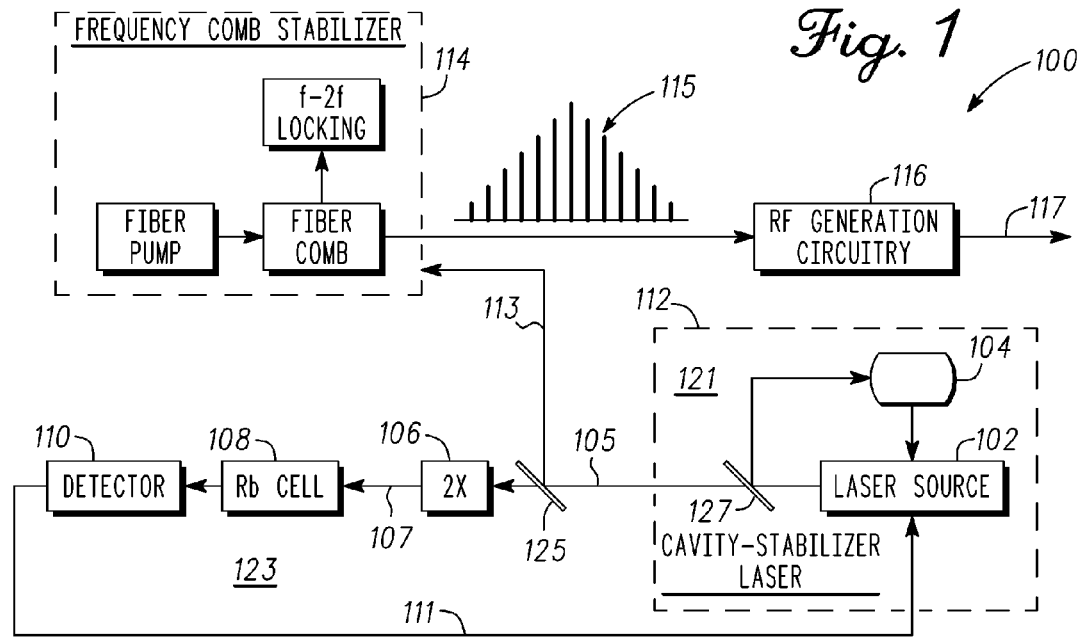
FIG. 1 is a functional diagram of an ultra-stable frequency reference generating system in accordance with some embodiments.

FIG. 1 is a functional diagram of an ultra-stable frequency reference generating system in accordance with some embodiments. Ultra-stable frequency reference generating system 100 may be configured to generate an ultra-stable frequency reference 117 having a frequency stability exceeding $5\times10^{-14}$. In some embodiments, the ultra-stable frequency reference generating system 100 may generate an ultra-stable frequency reference 117 having a frequency stability on the order of and possibly exceeding $10^{-15}$, although the scope of the embodiments is not limited in this respect.

Frequency stability, as used herein, refers generally to frequency variation at one second or with a one second averaging. A frequency stability of $10^{-15}$, for example, refers to the standard deviation of a series of frequency measurements within a one second averaging time per measurement.

In some embodiments, the ultra-stable frequency reference generating system 100 may include a cavity-stabilized reference laser 112 that includes a laser source 102 locked to a stabilized cavity 104. The system 100 may also include a Rubidium (Rb) cell 108 that may be interrogated by a stabilized laser output 105 of the cavity-stabilized reference laser 112 which may cause at least a two-photon Rubidium transition (to an upper state) within the Rubidium cell 108. A detector 110 may detect fluorescence 109 within the Rubidium cell 108 resulting from the spontaneous decay of the upper state Rubidium transition. In these embodiments, the detector 110 may provide a detector output 111 at a wavelength of the fluorescence to lock the cavity-stabilized reference laser 112 to generate a stabilized laser output 113. In these embodiments, the laser source 102 is locking to both the stabilized cavity 104 and the Rubidium transition within the Rubidium cell 108.

In some embodiments, the ultra-stable frequency reference generating system 100 may also include a frequency doubler 106 to double the frequency of the stabilized laser output 105. The doubled stabilized laser output 107 may be configured to interrogate the Rubidium cell 108 to generate an output for use in locking the laser source 102 to the Rubidium transition.

The ultra-stable frequency reference generating system 100 may also include a frequency comb stabilizer 114, which may be locked to the stabilized laser output 113. The frequency comb stabilizer 114 may generate an output of optical wavelengths which may comprise a super-continuum 115 of optical wavelengths. The super-continuum 115 may be an octave span of wavelengths, although the scope of the embodiments is not limited in this respect. In some embodiments, the spacing between the optical comb teeth may be determined by a femtosecond laser pulse repetition frequency of a femtosecond laser that may be used to generate the frequency comb.

In some embodiments, the ultra-stable frequency reference generating system 100 may also include RF generating circuitry 116 to generate the ultra-stable frequency reference 117 from the super-continuum 115 of optical wavelengths. The ultra-stable frequency reference 117 may comprise one or more ultra-stable RF or microwave output signals, although the scope of the embodiments is not limited in this respect. The RF generating circuitry 116 may include, among other things, a photo detector to convert the super-continuum 115 of optical wavelengths to the ultra-stable frequency reference 117. In some embodiments, the ultra-stable frequency reference 117 may comprise a set of RF or microwave signals.

In some embodiments, the frequency comb stabilizer 114 may include, among other things, a fiber pump, an f-2f locking interferometer and a fiber-based frequency comb (i.e., a fiber comb). The fiber-based frequency comb may include non-linear fiber to generate the super-continuum 115 of optical wavelengths. In some embodiments, the frequency comb stabilizer 114 includes a first control loop to stabilize the frequency comb relative to zero frequency and a second control loop to stabilize the frequency comb spacing. These embodiments are discussed in more detail below.

In some embodiments, the Rubidium cell 108 may be a Rubidium vapor cell comprising various isotopes of Rubidium such as Rubidium 85 and Rubidium 87 although the scope of the embodiments is not limited in this respect. In these embodiments, the Rubidium vapor cell is interrogated (illuminated by an optical source) to cause photon excitation.

As illustrated in FIG. 1, two complementary lock loops may be used to generate the stabilized laser output 113. A cavity-lock loop 121 may lock the laser source 102 to the stabilized cavity 104. The cavity-lock loop 121 may help short-term phase noise performance of the system 100. A frequency control loop 123 may lock the laser source 102 to the Rubidium transition within the Rubidium cell 108. The frequency control loop 123 may help reduce long-term environmental drift to help achieve longer-term stability. In these embodiments, the frequency control loop 123 may lock the laser source to a decay of an upper state Rubidium transition using two-photon excitation to generate the stabilized laser output.

In these embodiments, by locking the laser source 102 to a stabilized cavity 104, variation of the laser frequency of the cavity-stabilized reference laser 112 may be reduced. By locking the output of the cavity-stabilized reference laser 112 to an atomic transition (i.e., a two-photon Rubidium transition), the variation of the laser frequency is further reduced. Without the use of any locking loops, the frequency of the laser output may drift by several MHz over the course of a few minutes. Locking to the stabilized cavity 104 may reduce this drift substantially (e.g., by almost a million times or more). Locking to the two-photon Rubidium transition may remove any slow drift that remains. Accordingly, frequency fluctuations and drifts have been removed or at least largely reduced so that the output 113 is considered stabilized.

System 100 may provide significant improvement in long-term stability and phase noise is achieved over many conventional systems. For example, the ultra-stable frequency reference 117 generated by the ultra-stable frequency reference generating system 100 may have a frequency stability of at least $5 \times 10^{-14}$ or greater, and may even have a frequency stability exceeding $5 \times 10^{-15}$, although the scope of the embodiments is not limited in this respect. The ultra-stable frequency reference 117 may further have a phase noise of less than −100 dBc/Hz at one Hz off a 10 GHz carrier, for example.

The ultra-stable frequency reference generating system 100 may be implemented as a chip-scale frequency reference and may provide better performance than many conventional crystal oscillators currently in use in small, inexpensive devices such as handheld GPS receivers. In some embodiments, the ultra-stable frequency reference generating system 100 may be implemented a package suitable for integration into a spacecraft or airborne system.

The ultra-stable frequency reference generating system 100 may be also suitable for use in radar systems, communication systems and signal-collection systems. The ultra-stable frequency reference generating system 100 may also be suitable for use in systems that require synchronization. The ultra-stable frequency reference generating system 100 may also be suitable for use in difficult EMI environments.

Although the ultra-stable frequency reference generating system 100 is illustrated in FIG. 1 as having several separate functional elements, one or more of the functional elements may be combined and may be implemented by combinations of hardware elements and software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of the ultra-stable frequency reference generating system 100 may refer to one or more processes operating on one or more processing elements.

Figure 2A:
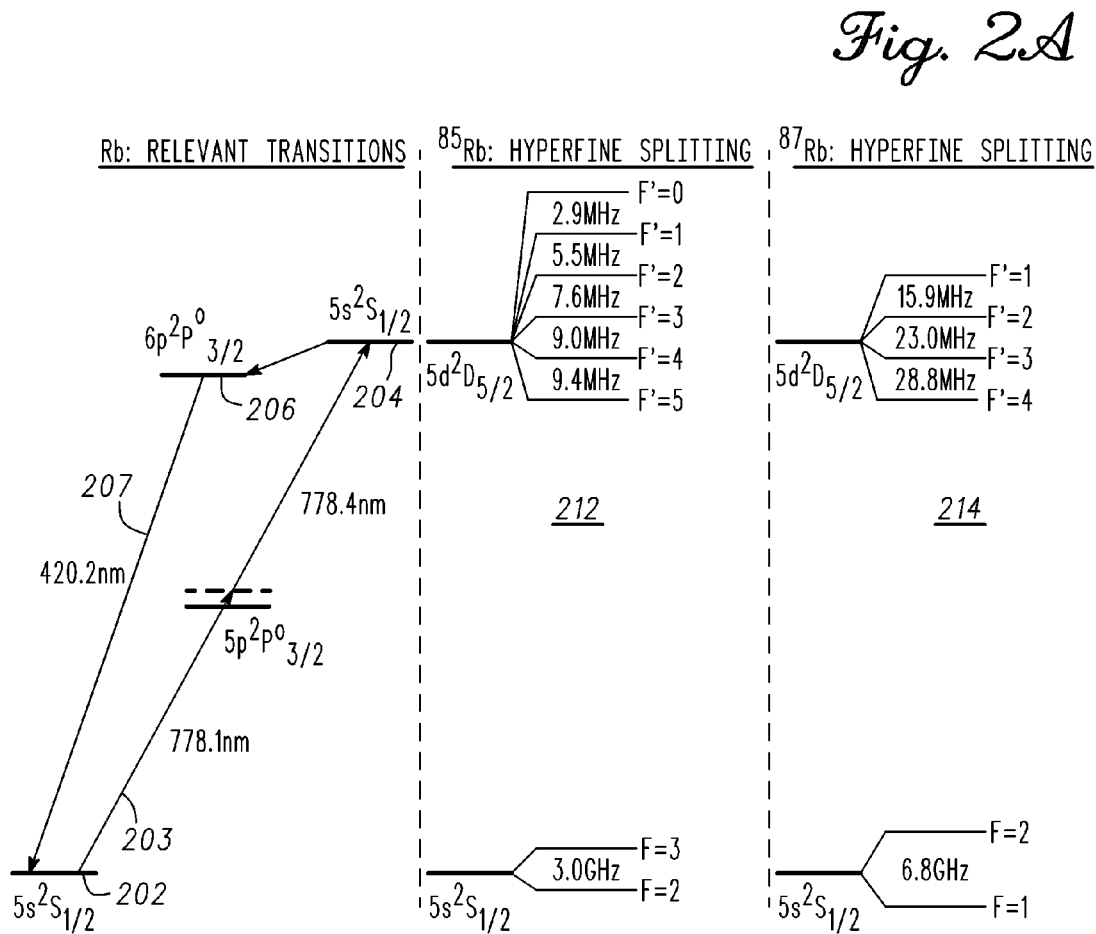
FIG. 2A illustrates Rubidium transitions in accordance with some embodiments.

FIG. 2A illustrates Rubidium transitions in accordance with some embodiments. As discussed above, interrogation of the Rubidium cell 108 (FIG. 1) by the stabilized laser output 107 (FIG. 1) may cause at least a two-photon Rubidium transition 203. The two-photon Rubidium transition 203 may be a two-photon Rubidium transition from the 5s state 202 to the 5d state 204 as illustrated. A spontaneous decay from the 6p state 206 to the 5s state 202, shown as decay transition 207, may result in fluorescence that may be detected by detector 110 (FIG. 1). The excited atoms spontaneously decay from an upper state (e.g., state 206) to a lower state (e.g., state 202) emitting a fluorescence at a precise wavelength.

In these embodiments, the two-photon Rubidium transition 203 from the 5s state 202 to the 5d state 204 may be at wavelength of precisely 778.1 nm. The decay transition 207 and the detected fluorescence 109 (FIG. 1) may be at a wavelength of precisely 420.2 nm. In these embodiments, the detector output 111 (FIG. 1) may be at the wavelength of the decay transition 207 (e.g., 420.2 nm) and may be used to further lock the cavity-stabilized reference laser 112 (FIG. 1) to generate the stabilized laser output 113 (FIG. 1). In these embodiments, the detector 110 may be selected to be sensitive to the wavelength of the decay transition 207.

In some example embodiments, the laser source 102 may be a 1556 nm fiber laser that generates a 1556 nm wavelength. When halved by the wavelength divider 106 (FIG. 1), a 778 nm wavelength may be produced which may be used to cause the two-photon transition 203 within the Rubidium cell 108. In these example embodiments, the 1556 nm fiber laser is used since the two-photon Rubidium transition 203 occurs at precisely 778 nm, which is precisely half of the 1556 nm wavelength. Other laser source and wavelength divider/multiplier combinations may also be used to generate a 778 nm wavelength to cause the two-photon Rubidium transition 203. In some embodiments, the wavelength divider 106 may comprise non-linear optics to convert the 1556 nm wavelength to a 778 nm wavelength, although this is not a requirement.

FIG. 2A also illustrates hyperfine splitting 212 for Rubidium 85 and hyperfine splitting 214 for Rubidium 87. This hyperfine splitting results in different transitions and may occur for the 5s state 202 and the 5d state 205 as shown. In accordance with some embodiments, the strongest transition in one of the isotopes of Rubidium may be used for stabilization.

In some embodiments, the stabilized cavity 104 (FIG. 1) may be a dimensionally-stable optical cavity and may be an ultra-low expansion (ULE) glass Fabry-Perot cavity, although this is not a requirement. The output of the laser source 102 may be pre-stabilized to the optical cavity using a Pound-Drever-Hall (PDH) stabilization technique. This pre-stabilization may improve the short term stability of the ultra-stable frequency reference generating system 100. In an example embodiment, a Fabry Perot cavity may be used that has length of 7.75 cm and a high finesse of greater than or equal to 150,000. In some embodiments, a notched mount cavity with finesse of 10,000 may be used, while in other embodiments, a mid-plane mount cavity with finesse of 150,000 may be used. Although pre-stabilizing the laser source 102 to a high finesse cavity improves its short term frequency stability, at longer times thermal drift of the cavity length may cause unwanted frequency wander. This frequency wander may be removed by locking the frequency of the laser source 102 to the time invariant two-photon Rubidium transition.

Figure 2B:
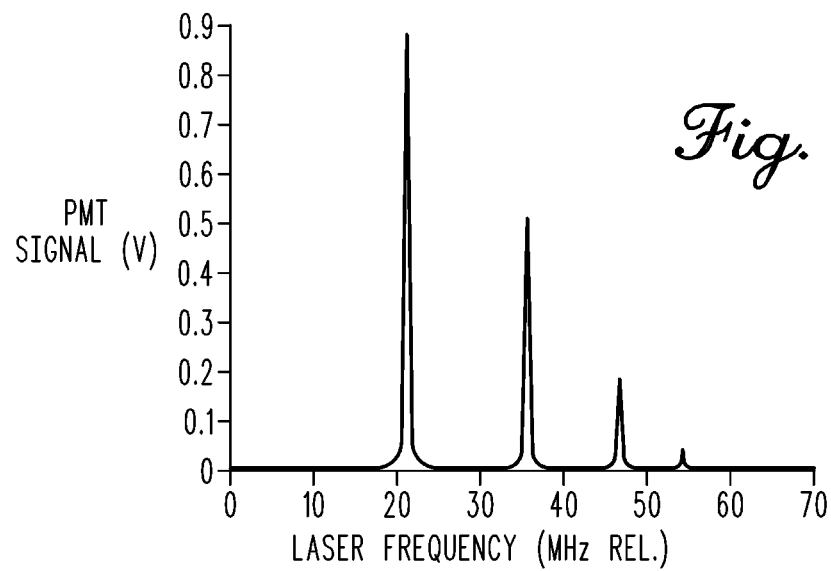
FIG. 2B illustrates a sample spectrum of hyperfine transitions that may be used as frequency references in accordance with some embodiments.

FIG. 2B illustrates a sample spectrum of hyperfine transitions that may be used as frequency references in accordance with some embodiments. The sample spectrum of the $5S_{1/2}$ (F=2)→5D5/2(F=4, 3, 2, 1) hyperfine transitions is shown, which includes a spectra of transitions from the $5S_{1/2}$ ground state into the $5D_{5/2}$ excited state. The spectra are transitions in $^{87}$Rb from the hyperfine ground state F=2 to the hyperfine excited states (from the left) F=4, F=3, F=2 and F=1 are also shown.

Figure 3:
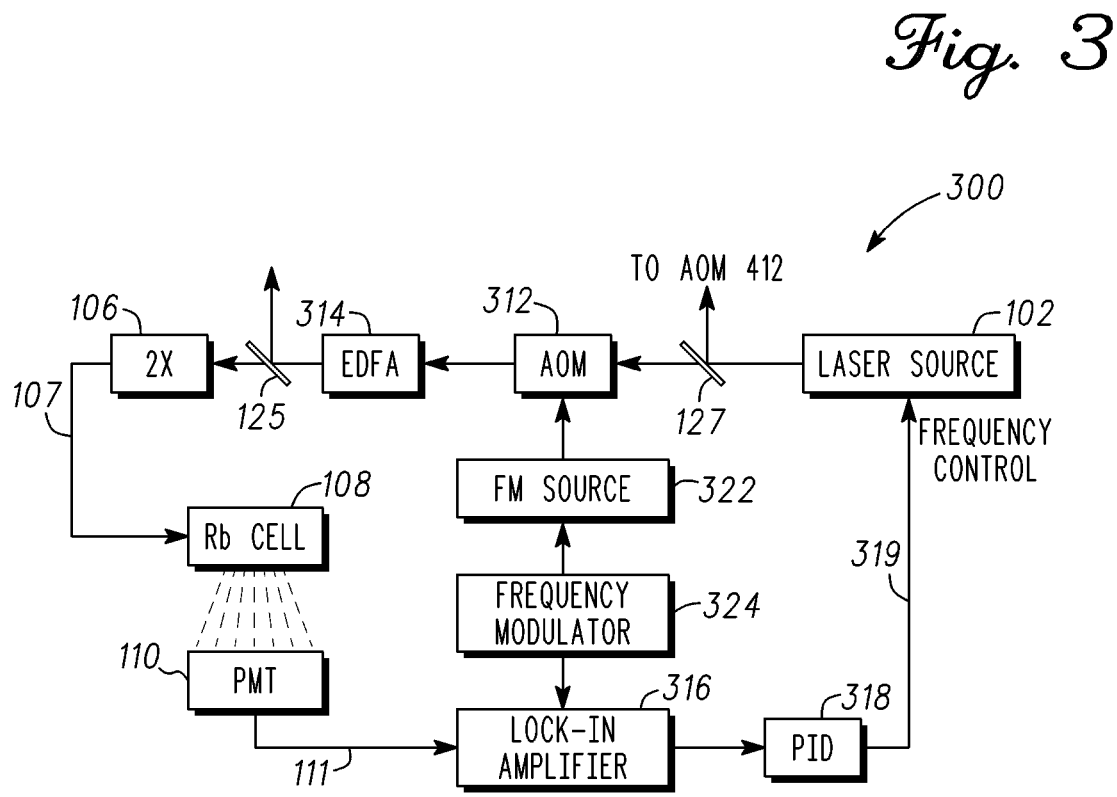
FIG. 3 illustrates a frequency control loop for an ultra-stable frequency reference generating system in accordance with some embodiments.

FIG. 3 illustrates a frequency control loop for an ultra-stable frequency reference generating system in accordance with some embodiments. Frequency control loop 300 may be suitable for use as frequency control loop 123 (FIG. 1) to lock the laser source 102 (FIG. 1) to the Rubidium transition 207 (FIG. 2A).

In addition to laser source 102, the wavelength divider 106, the Rubidium cell 108 and the detector 110 previously discussed, the frequency control loop 300 may include a modulator such as an acousto-optic modulator (AOM) 312 to modulate the stabilized laser output 105. The frequency control loop 300 may also include an amplifier such as an erbium-doped fiber amplifier (EDFA) 314 to amplify the modulated output of the AOM 312 prior to coupler 125 which couples wavelengths to the frequency comb stabilizer 114 (FIG. 1). The frequency control loop 300 may also include a lock-in amplifier 316 and a proportional integral derivate (PID) controller 318 to operate on the output signal 111 from the detector and generate an error signal 319 for frequency control of the laser source 102. An FM source 322 may provide an FM signal to the AOM 312 and may be modulated by frequency modulator 324 that may be used provide a dither on the error signal 319 for the frequency control of the laser source 102. To generate the error signal 319 used to lock the pre-stabilized reference laser to the frequency of the two-photon resonance in Rubidium, the probe beam may be frequency dithered and the resulting fluorescence may be demodulated using the lock-in amplifier 316. In some embodiments, the detector 110 may comprise a photo-multiplier tube (PMT).

Figure 4:
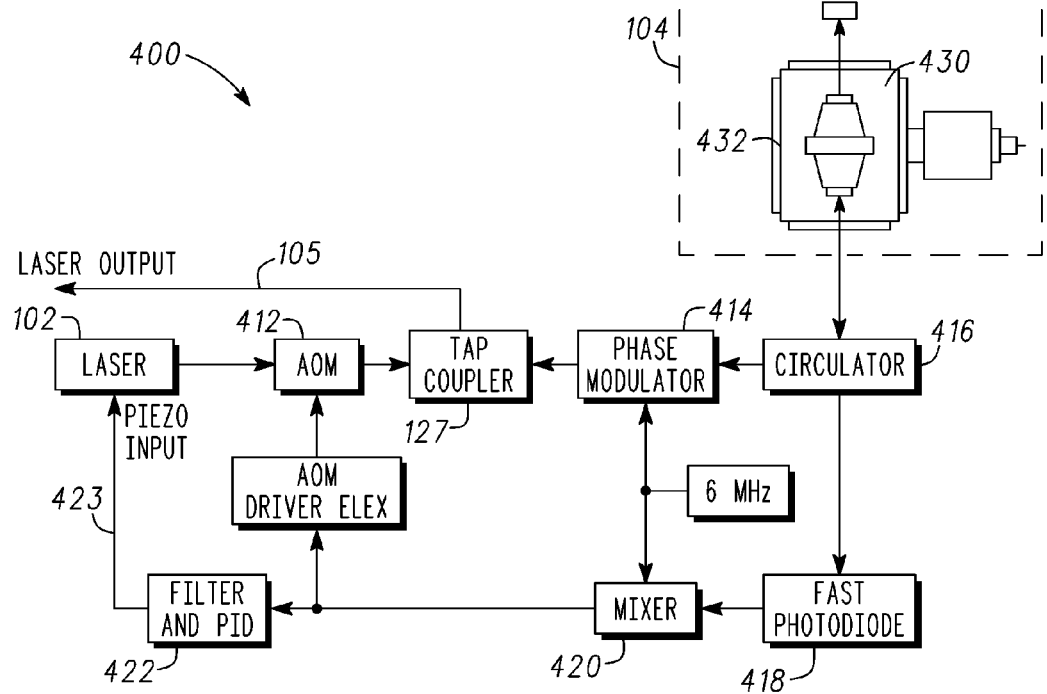
FIG. 4 illustrates a cavity lock loop for an ultra-stable frequency reference generating system in accordance with some embodiments.

FIG. 4 illustrates a cavity lock loop for an ultra-stable frequency reference generating system in accordance with some embodiments. Cavity lock loop 400 may be suitable for use as cavity lock loop 121 (FIG. 1) to lock the laser source 102 to the cavity 104. The use of cavity lock loop 400 may help achieve improved short-term phase noise performance.

The cavity lock loop 400 may include an AOM 412 to compensate for any frequency offset of the stabilized cavity 104 and a tap coupler 127 to couple the stabilized laser output 105 to AOM 312 (FIG. 3). The cavity lock loop 400 may also include a phase modulator 414, a circulator 416, a fast photodiode 418, a mixer 420 and a filter and PID element 422 arranged in a feedback loop to provide a feedback signal 423 to the laser source 102. In some embodiments, the feedback signal 423 may be provided to a piezo input of the laser source 102 which controls a piezo-actuated mirror.

In some example embodiments, the stabilized cavity 104 may include a ULE cavity 430 that may be provided within a vacuum enclosure 432. The stabilized cavity 104 may also include acoustic and vibration isolation, although these are not requirements as other techniques for cavity stabilization may be used.

Figure 5:
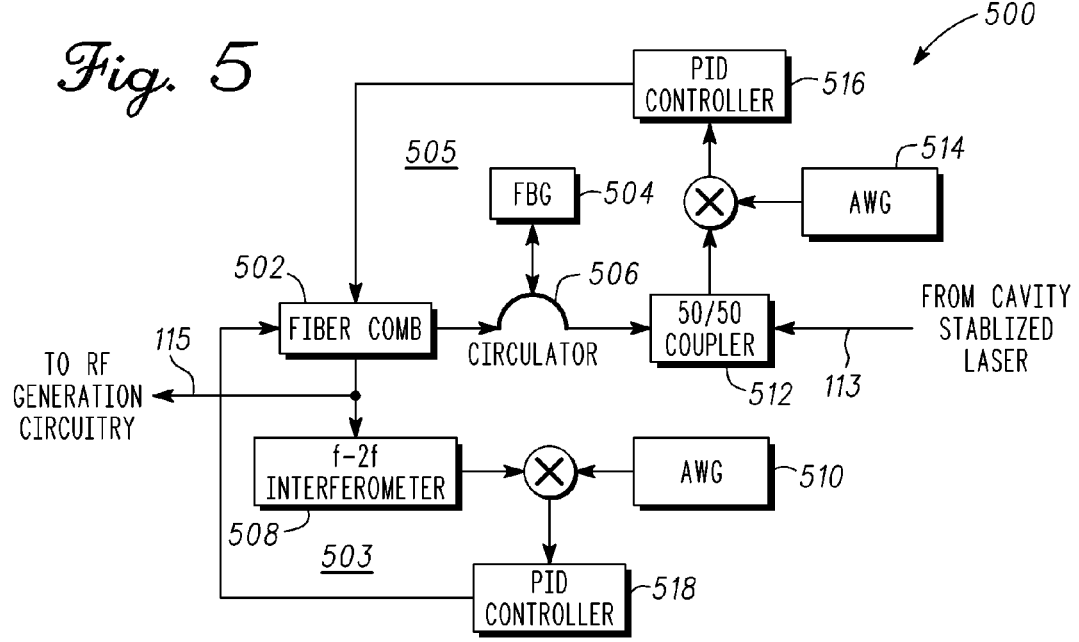
FIG. 5 illustrates a frequency comb stabilizer for an ultra-stable frequency reference generating system in accordance with some embodiments.

FIG. 5 illustrates a frequency comb stabilizer for an ultra-stable frequency reference generating system in accordance with some embodiments. The frequency comb stabilizer 500 may be suitable for use within the frequency comb stabilizer 114 (FIG. 1) of ultra-stable frequency reference generating system 100 (FIG. 1), although other configurations may also be suitable. The frequency comb stabilizer 500 may generate the super-continuum 115 from the stabilized laser output 113

(FIG. 1). In some embodiments, the super-continuum 115 may, for example, comprise at least an octave span of wavelengths.

As illustrated in FIG. 5, the frequency comb stabilizer 500 includes a first frequency comb stabilizer control loop 503 to stabilize the frequency comb relative to zero frequency, and a second frequency comb stabilizer control loop 505 to stabilize the frequency comb spacing.

The frequency comb stabilizer 500 may include a fiber-based frequency comb 502 that includes a non-linear fiber to generate the super-continuum 115 of optical wavelengths. An interferometer, such as f-2f interferometer 508, may generate a beat tone from the super-continuum 115 for mixing with an output of a waveform generator 510 to provide an input to PID controller 518 to generate a carrier-envelope offset (CEO) frequency as feedback 519 to the fiber-based frequency comb 502 as part of control loop 503.

Control loop 505 may include a 50-50 coupler 512 to combine the stabilized laser output 113 (FIG. 1) with an output of the fiber comb 502 to generate an RF beat tone which may be mixed with an output from a waveform generator 514 to provide an input to PID controller 516. The PID controller 516 may generate feedback for the fiber comb 502. In some embodiments, a fiber-brag grating (FBG) 504 and a circulator 506 may be included in control loop 505 to filter the optical signal and reduce detection noise.

Referring back to FIG. 1, in some embodiments, in addition to a photo detector, the RF generating circuitry 116 may also include a microwave frequency comb to generate multiple microwave signals from the output of the photo-detector. These multiple microwave signals may comprise a set of clock or reference signals and may have a stability approximating the stability of the stabilized laser output 113 (e.g., on the order of $5 \times 10^{-15}$ to $5 \times 10^{-14}$ at a one-second average). The multiple microwave signals may correspond to the ultra-stable frequency reference 117 (FIG. 1). In these embodiments, the set of clock or reference signals may be suitable for use as clock signals in a system that uses multiple clock signals having a common reference, although the scope of the embodiments is not limited in this respect. In some embodiments, a set of optical reference signals may be generated which may be used to lock other lasers and/or may be used as a reference for optical sensors.

Figure 6:
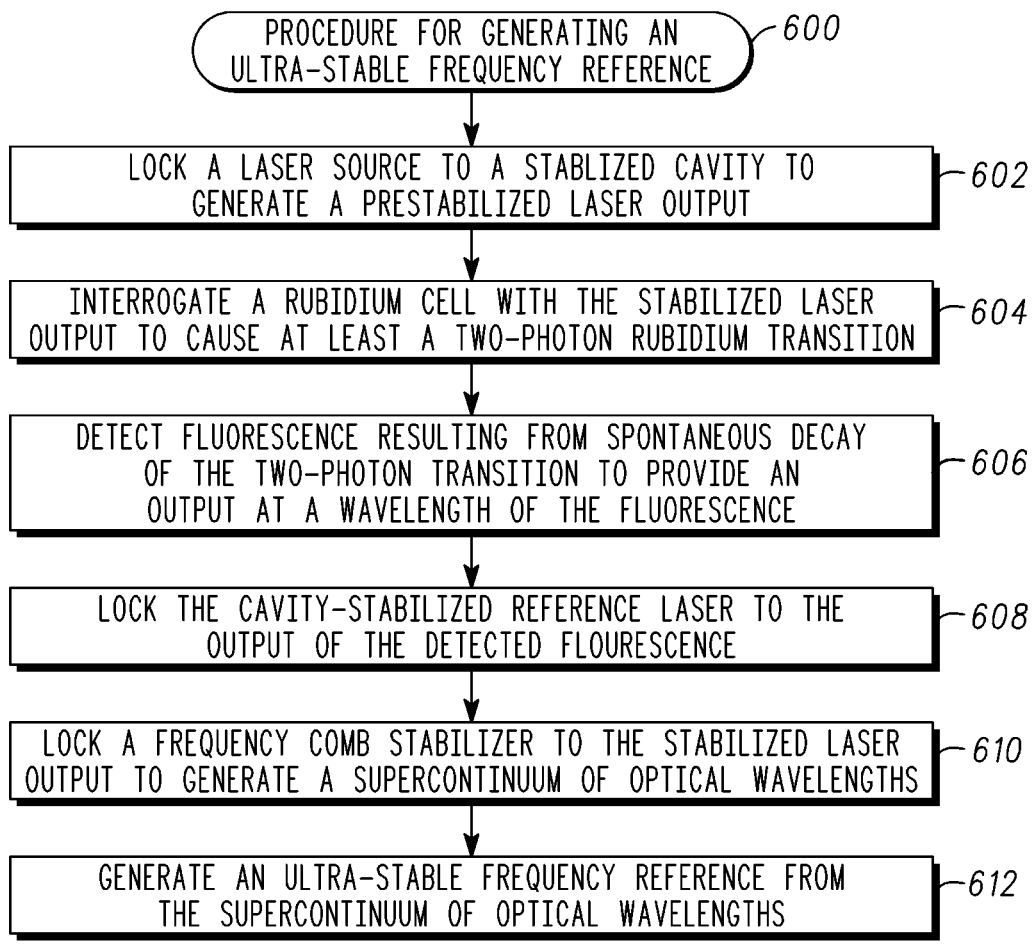
FIG. 6 is a procedure for generating an ultra-stable frequency reference in accordance with some embodiments.

FIG. 6 is a procedure for generating an ultra-stable frequency reference in accordance with some embodiments. Procedure 600 may be performed by an ultra-stable frequency reference generating system, such as ultra-stable frequency reference generating system 100 (FIG. 1), although other ultra-stable frequency reference generating systems may also be suitable for use in implementing procedure 600.

Operation 602 comprises locking a laser source to a stabilized cavity to generate a pre-stabilized laser output. In some embodiments, the components of cavity-lock loop 121 (FIG. 1) may be used.

Operation 604 comprises interrogating a Rubidium cell with the pre-stabilized laser output to cause at least a two-photon Rubidium transition. In some embodiments, the two-photon Rubidium transition 203 (FIG. 2A) may result from interrogation of the Rubidium cell 108 (FIG. 1) with a 778.1 nm wavelength.

Operation 606 comprises detecting fluorescence resulting from the spontaneous decay of the two-photon Rubidium transition to provide an output at a wavelength of the fluorescence. The fluorescence may result from the decay transition 207 (FIG. 2A).

Operation 608 comprises locking the cavity-stabilized reference laser to the output of the detected fluorescence generate a stabilized laser output. In some embodiments, the components of the frequency control loop 123 (FIG. 1) may be used.

Operation 610 comprises locking a frequency comb stabilizer to the stabilized laser output to generate a super-continuum of optical wavelengths. Operation 610 may, for example, be performed by frequency comb stabilizer 114 (FIG. 1).

Operation 612 comprises generating an ultra-stable frequency reference from the super-continuum of optical wavelengths. Operation 612 may, for example, be performed by RF generation circuitry 116 (FIG. 1).

In some embodiments, system 100 (FIG. 1) may comprise a photonic oscillator that is referenced to an atomic resonance (i.e., the Rubidium transition). The frequency stability of an oscillator ($\Delta f/f$) that is referenced to an atomic resonance may be fundamentally limited by both the measured Q of the two-photon transition and the signal to noise ratio (SNR) based on the following equation.

$$\frac{\Delta f}{f} = \frac{1}{Q * SNR * \sqrt{\tau}}$$

Q may be defined as the frequency of the transition divided by the measured linewidth of the transition ($v/\Delta v$) and $\tau$ is the averaging time. The measured linewidth may exceed the natural linewidth due to a variety of broadening mechanisms. To minimize broadening, magnetic shielding may be provided around the rubidium cell 108. This may greatly reduce Zeeman broadening resulting in a measured linewidth near the natural width of 350 kHz. In order to increase the signal to noise level, the fluorescence detection may be operated in a shot-noise limited regime which may be achieved by collecting a sizable portion of the 420.2 nm fluorescence, maximizing the frequency doubling process to 778 nm, optimizing the detector for 420.2 nm operation, eliminating stray light, minimizing detector noise such as Johnson noise and operating a clock with a high Rb vapor pressure. The natural linewidth limited Q of the two-photon transition is $Q=2.6 \times 10^9$ and with a practical SNR of 15000 the system stability may be approximately $2.3 \times 10^{-14}$ in 1 second and approaching $10^{-15}$ with less than two minutes of integration. To translate this stability into the microwave/RF domain, the system 100 may utilize a compact means to divide down from the optical domain. This may be accomplished using a femtosecond laser based frequency comb in circuitry 116 (FIG. 1). To transfer the stability from optical to the microwave, the femtosecond frequency comb may be locked to the cavity stabilized laser 112.

The process for stabilizing the fiber-based frequency comb 502 (FIG. 5) to an externally-stabilized reference laser (i.e., laser output 113), as shown in FIG. 5 as the frequency comb stabilizer 500 in which an envelope offset (CEO) stabilization is used. Control loop stabilizes 503 the frequency comb relative to zero frequency. The super-continuum 115 may be generated within the frequency comb 502 through a highly nonlinear fiber. The super-continuum 115 may fulfill an octave spanning to generate a beat tone between a fundamental portion of the spectrum and the second harmonic of the octave of the fundamental represents the frequency comb offset from zero. This tone is subsequently mixed in a digital phase detector with an RF tone generated from a disciplined arbitrary waveform generator (AWG) 510. The mixed down signal is feed into PID controller 518 which adjusts the pump power to mode-locked the fiber-based frequency comb 502.

The other control loop 505 may stabilize the frequency comb spacing. This may be achieved by stabilizing the cavity length of the mode-locked fiber-based frequency comb. In an example embodiment, the spectrum may be initially narrowed from approximately 100 nm to 0.1 nm through the FBG 504, whose center wave is equal to that of the cavity stabilized laser. This narrowing process may limit the shot noise on the photo detector, which generates the RF beat tone used to stabilize the frequency comb. After narrowing, the frequency comb is coupled with the cavity stabilized laser using the 50-50 coupler 512 which results in an RF beat tone signifying the frequency difference between the comb line and cavity stabilized laser. The RF beat tone may be generated by an InGaAs photo detector, which may be part of the 50-50 coupler 512. The resulting RF signal may be mixed against a second disciplined AWG 514 in a digital phase detector. The digital phase detector may be capable of generating an error signal over thirty radians of phase excursions, which allows 10× more phase excursions compared to using an analog mixer as a phase detector. The output from the digital phase detector is routed to the PID controller 516, which generates the error signal for the comb spacing feedback. In some embodiments, the error signal may control a piezo-actuated mirror inside the fiber-based frequency comb with approximately 10 kHz of bandwidth.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may be implemented with one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An ultra-stable frequency reference generating system comprising:
    a cavity-stabilized reference laser comprising a laser source locked to a stabilized cavity to generate a stabilized laser output;
    a frequency doubler configured to double a frequency of the stabilized laser output to form a frequency-doubled stabilized laser output;
    a Rubidium cell configured to be interrogated by the frequency-doubled stabilized laser output to cause at least a two-photon Rubidium transition;
    a detector to detect fluorescence resulting from spontaneous decay of the Rubidium transition; and
    a frequency comb stabilizer locked to the stabilized laser output to generate an optical output for use in generating an ultra-stable frequency reference.

2. The ultra-stable frequency reference generating system of claim 1 wherein the frequency comb stabilizer includes:
    a frequency comb;
    a first control loop to stabilize the frequency comb relative to zero frequency; and
    a second control loop to stabilize a frequency comb spacing of the frequency comb.

3. The ultra-stable frequency reference generating system of claim 2 wherein the frequency comb is a femtosecond frequency comb.

4. The ultra-stable frequency reference generating system of claim 3 wherein the frequency comb stabilizer is locked to the stabilized laser output to generate a super-continuum of optical wavelengths for use in generating the ultra-stable frequency reference, and
    wherein the detector is configured to provide a detector output at a wavelength of the fluorescence to lock the cavity-stabilized reference laser to generate the stabilized laser output.

5. The ultra-stable frequency reference generating system of claim 2 wherein the two-photon Rubidium transition is a two-photon Rubidium transition from a 5s state to a 5d state, and
    wherein the detected fluorescence results from the spontaneous decay from a 6p state to the 5s state, and
    wherein the Rubidium cell is a Rubidium vapor cell comprising Rubidium 87.

6. The ultra-stable frequency reference generating system of claim 5 further comprising a wavelength divider to half the wavelength of the stabilized laser output,
    wherein the halved stabilized laser output is to interrogate the Rubidium cell to generate an output for use in locking the cavity-stabilized reference laser to the Rubidium transition.

7. The ultra-stable frequency reference generating system of claim 2 wherein the stabilized cavity is a dimensionally-stable optical cavity and comprises an ultra-low expansion (ULE) glass Fabry-Perot cavity, and
    wherein an output of the laser source is pre-stabilized to the optical cavity using a Pound-Drever-Hall stabilization technique.

8. The ultra-stable frequency reference generating system of claim 2 wherein the frequency comb comprises a fiber-based frequency comb that includes a non-linear fiber, and
    wherein the fiber-based frequency comb is to generate a super-continuum of optical wavelengths comprising at least an octave span.

9. The ultra-stable frequency reference generating system of claim 2 further comprising RF generating circuitry to generate the ultra-stable frequency reference from the super-continuum of optical wavelengths, the ultra-stable frequency reference comprising one or more ultra-stable microwave or RF output signals.

10. The ultra-stable frequency reference generating system of claim 9 wherein the RF generating circuitry comprises:
    a photo-detector to convert the super-continuum of optical wavelengths to a set of microwave signals; and
    a microwave frequency comb to generate a set of microwave clock or reference signals from the output of the photo-detector, the set of microwave clock or reference signals having a stability approximating a stability of the stabilized laser output.

11. The ultra-stable frequency reference generating system of claim 2 further comprising optical reference signal generating circuitry to convert the super-continuum of optical wavelengths to a set of optical reference signals.

12. The ultra-stable frequency reference generating system of claim 1 wherein the stabilized laser output has a stability on the order of $10^{-15}$.

13. A method to generate an ultra-stable frequency reference comprising:
   locking a laser source to a stabilized cavity to generate a pre-stabilized laser output;
   further locking the laser source to a decay of a two-photon Rubidium transition to generate a stabilized laser output;
   doubling a frequency of the stabilized laser output to generate a frequency-doubled stabilized laser output; and
   locking a frequency comb stabilizer to the frequency-doubled stabilized laser output to generate an optical output for use in generating an ultra-stable frequency reference.

14. The method of claim 13 wherein locking the frequency comb stabilizer to the stabilized laser output generates a super-continuum of optical wavelengths, and
   wherein the method further comprises generating the ultra-stable frequency reference from the super-continuum.

15. The method of claim 14 wherein the frequency comb stabilizer comprises a fiber-based frequency comb that includes a non-linear fiber, and
   wherein the method comprises generating the super-continuum of optical wavelengths comprising at least an octave span with the fiber-based frequency comb.

16. The method of claim 15 further comprising:
   interrogating a Rubidium cell with the pre-stabilized laser output to cause at least the two-photon Rubidium transition to an upper state; and
   detecting fluorescence resulting from spontaneous decay of the upper state Rubidium transition to provide a detected output at a wavelength of the fluorescence for use in further locking the laser source.

17. The method of claim 16 wherein the Rubidium cell is a Rubidium vapor cell comprising Rubidium 87,
   wherein the two-photon Rubidium transition is a two-photon Rubidium transition from a 5s state to a 5d state,
   wherein the detected fluorescence results from the spontaneous decay from a 6p state to the 5s state.

18. An ultra-stable frequency reference generating system comprising:
   a cavity lock loop to lock a laser source to a stabilized cavity and generate a pre-stabilized laser output;
   a frequency control loop to further lock the laser source to a decay of an upper state Rubidium transition using two photon excitation to generate a stabilized laser output;
   a frequency doubler to double a frequency of the stabilized laser output to form a frequency-doubled stabilized laser output;
   a frequency comb stabilizer having a first frequency comb stabilizer control loop to stabilize a frequency comb relative to zero frequency and a second frequency comb stabilizer control loop to stabilize a frequency comb spacing,
   wherein the frequency comb stabilizer is locked to the frequency-doubled stabilized laser output to generate optical wavelengths for use in generating an ultra-stable frequency reference.

19. The ultra-stable frequency reference generating system of claim 18 wherein the cavity lock loop comprises a cavity-stabilized reference laser comprising the laser source locked to the stabilized cavity,
   wherein the frequency control loop comprises:
   a Rubidium cell configured to be interrogated by the stabilized laser output to cause at least a two-photon Rubidium transition; and
   a detector to detect fluorescence resulting from spontaneous decay of the transition,
   wherein the detector is configured to provide a detector output at a wavelength of the fluorescence to lock the cavity-stabilized reference laser to generate the stabilized laser output.

20. The ultra-stable frequency reference generating system of claim 19 wherein the Rubidium cell is a Rubidium vapor cell comprising Rubidium 87,
   wherein the two-photon Rubidium transition is a two-photon Rubidium transition from a 5s state to a 5d state, and
   wherein the detected fluorescence results from the spontaneous decay from a 6p state to the 5s state.

21. The ultra-stable frequency reference generating system of claim 19 wherein the frequency comb stabilizer comprises a fiber-based frequency comb that includes a non-linear fiber, and
   wherein the fiber-based frequency comb is to generate the super-continuum of optical wavelengths comprising at least an octave span.

22. The ultra-stable frequency reference generating system of claim 18 wherein the frequency comb is a femtosecond frequency comb.

23. A method to generate an ultra-stable frequency reference comprising:
   generating a stabilized laser output from a cavity-stabilized reference laser that includes a laser source locked to a stabilized cavity;
   doubling a frequency of the stabilized laser output to generate a frequency-doubled stabilized laser output;
   interrogating a Rubidium cell by the frequency-doubled stabilized laser output to cause at least a two-photon Rubidium transition; and
   detecting fluorescence resulting from spontaneous decay of the Rubidium transition to provide a detected output at a wavelength of the fluorescence; a
   locking the cavity-stabilized reference laser to the wavelength of the fluorescence; and
   locking a frequency comb stabilizer to the stabilized laser output to generate a continuum of optical wavelengths.

24. The method of claim 23 further comprising generating an ultra-stable frequency reference from the continuum of optical wavelengths.

25. The method of claim 24 wherein locking the frequency comb stabilizer comprises:
   stabilizing a frequency comb relative to zero frequency with a first control loop; and stabilizing a frequency comb spacing of the frequency comb with a second control loop.

* * * * *